3,280,122
DIPHENYLALKYLOXADIAZOLES

Kálmán Harsányi, Pál Kiss, Dezsö Korbonits, Ilona Malyáta, Ilona Erdéli, Laszlo Tardos, and György P. Leszkovszky, all of Budapest, Hungary, assignors to Chinoin Gyógyszer- és Vegyészeti Termékek Gyára RT., Budapest, Hungary, a firm
No Drawing. Filed Mar. 24, 1964, Ser. No. 354,465
Claims priority, application Hungary, Mar. 29, 1963, Cl 438
27 Claims. (Cl. 260—247.5)

This invention relates to new 1,2,4-oxadiazole derivatives of therapeutic value to the preparation of such compounds and to pharmaceutical compositions containing same. More particularly it is concerned with 1,2,4-oxadiazole derivatives substituted in their positions 3 and 5.

According to the first feature of the present invention there are provided 1,2,4-oxadiazole derivatives of the general Formula I where:

R stands for an alkoxy- and/or halogeno substituted aryl group or a diphenyl-methyl group which may be substituted by a halogeno- or alkoxy-group, A stands in the case of R being an aromatic group for an alkylene group, or in the case of R being a diphenyl-methyl group for an alkylene group or for a valency bond, while $R^1$ stands for the grouping of the Formula II, where $A^1$ stands for a valency bond or for an alkylene group and B stands for an amino group, an alkyl amino group, a dialkyl amino group, or for an aromatic group substituted with an amine, or for a heterocyclic group containing nitrogen, or for an alkyl group, and acid salts of these compounds.

Specific compounds according to the present invention are the 1,2,4-oxadiazole derivatives substituted in their position 3 by a beta,beta-diphenyl-ethyl, alpha,beta-diphenyl-ethyl, diphenyl-methyl,3,4-dimethoxy-benzyl, p-chloro-benzyl, beta,beta-bis-(4-chloro - phenyl) - ethyl or bis-(3,4-dimethoxy-phenyl)-methyl group and in their position 5 by a beta-piperidino-ethyl, beta-pyrrolidino-ethyl, piperidino-methyl, beta-diethyl-amino-ethyl, gamma-chloro-propyl, gamma-piperidino-propyl, gamma-morpholino-propyl, 4-amino-phenyl, 4-pyridyl, 3-pyridyl, 2-pyridyl, beta-morpholino-ethyl, or beta-(N-methyl-piperazino)-ethyl group, and their acid addition salts formed with mineral or organic acids, especially their hydrochlorides and hydrogenmaleates.

The compounds of the general Formula I exhibit spasmolytic, local anesthetic, antitussive, anti-inflammatory, anti-pyretic and vasodilator effect. The most preferred representative of these compounds is 3-(beta,beta-diphenyl-ethyl)-5-(beta-piperidino-ethyl)-1,2,4-oxadiazole and salts of same, which can be used in human therapy as antitussive and spasmolytic agent, preferably in the form of 0.1 g. tablets.

According to a further feature of the invention there is provided a process for the preparation of the 1,2,4-oxadiazole derivatives of the general Formula I or salts of same which comprises reacting amidoximes of the general Formula III (where R and A have the same meaning as stated above) with acids of the general Formula IV (where $R^2$ stands for $R^1$ or for a group capable of being transformed into $R^1$) or with acid derivatives of acids of the general Formula IV capable of acylation, thus (a) Obtaining acylated derivatives of compounds of the general Formula III in which the group $R^2$ may be transformed into the group $R^1$ if desired and carrying out ring-closure by means of eliminating water or by pyrolyses, or (b) Preparing compounds of the general Formula V (where R, A and $R^2$ have the same meaning as stated above), transforming the group $R^2$ into the group $R^1$ if desired and/or converting the products thus obtained into their salts formed with acids, or setting free the bases from their salts.

According to method (a) of the invention amidoximes of the general Formula III are reacted with acids of the general Formula IV or with derivatives of the same capable of acylation, i.e. with acid halogenides or acid anhydrides. When acid halogenides are used it is preferable to carry out the reaction in the presence of acid-binding agents, such as alkali carbonates, alkali hydrogen carbonates, tertiary amines. An excess of amidoxime can also be used as acid-binding agent. It is convenient to effect the reaction in an inert solvent. Ethers, hydrocarbons, acetone or halogenated hydrocarbons, such as chloroform may be used as inert solvent. When alkali hydrogen carbonates are used as acid-binding agent it is preferable to carry out the reaction in anhydrous acetone as medium. The reaction is preferably effected using substantially equimolecular proportions of the reactants or a small excess of the acylating agent. It is preferable to carry out the reaction at low temperatures; cooling may be advantageous. In case of aromatic acids and their derivatives the reaction temperature should not exceed 30° C., while in case of aliphatic acids and their derivatives it should be maximum 80° C. The acylated product and when acid halogenides are used without employing an acid-binding agent also the salt of the amidoxime may precipitate from the reaction mixture. The salt of the amidoxime is generally soluble in water, thus it can be removed from beside the O-acylamidoxime by washing with water. The O-acylamidoxime can also be isolated by evaporating the solvent, or when using acetone as solvent by pouring the reaction mixture into water.

According to the second step of method (a) of the claimed process esters of the amidoximes are submitted to pyrolysis at a temperature exceeding the melting point of the ester. One may proceed by carrying out the reaction in the presence of acetic acid anhydride as a water binding agent or by adding an organic solvent, e.g., toluene to the reaction mixture in order to evaporate water. In the acylated derivatives of amidoximes of the general Formula III the group $R^2$ of the end product may be transformed into the group $R^1$ if desired according to methods described below.

Method (b) of the process comprises reacting amidoximes of the general Formula III with acids of the general Formula IV or with derivatives of same capable of acylation at a temperature exceeding 100° C., preferably at 105–120° C. The reaction may be carried out in the presence or absence of a solvent. Toluene, xylene, an excess of the acylating agent or preferably pyridine may be used as solvent. The product is isolated by cooling the solution or by evaporating the solvent.

Method (b) of the present invention may be advantageously effected by reacting acid esters of the general Formula VI (where $R^3$ stands for an alkyl group) with amidoximes of the general Formula III in the presence of alkali or alkaline earth alcoholates. The reaction is carried out using 0.1–2.0 moles, preferably 1 mole of alkali alcoholate or an equivalent amount of alkaline earth alcoholate and an excess of 0.1–1.5 moles of the ester calculated on the amidoxime component. The reaction is preferably carried out at 50–120° C. It is advantageous to effect the reaction by boiling the alcohol solution of the reactants.

The reaction mixture is worked up according to methods depending on the physical properties of the product. When the product is insoluble in aqueous alcohol it can be isolated by adding water to the reaction mixture. A further method comprises evaporating the solvent and dissolving the residue in water. It is preferred to add an aqueous sodium hydroxide solution in order to decompose the excess of the ester. In the case of certain products the alcohol is distilled off and water is added to the residue, whereupon the end-product precipitates in the form of an oil. The product is isolated by way of extraction and evaporation of the solvent.

The group $R^1$ may be already present in the starting material but it may also be formed in the acyl derivatives of the amidoximes or in the compounds of the general Formula V by further chemical reactions. The chemical reactions employed depend on the character of the substituent $R^1$ group of the end-product and of the substituent $R^2$ group of the intermediate product.

Amino groups may be preferably formed by means of substituting the appropriate halogen or sulfonic acid ester group by an amino group or by reducing a nitro group. One may proceed by using starting materials in which $R^2$ stands for a carbonyl group and thus forming the desired $R^1$ group by submitting the starting material to reductive condensation with amines. Alkylated amino groups may be formed by N-alkylating the primary amino groups with alkyl halogenides, alkyl sulfates, etc. The primary amino groups may either be present in the starting material or may be formed by further chemical reactions.

It has been also found that compounds of the general Formula VII (where R and A have the same meaning as stated above, B and D may be the same or different and stand for hydrogen, alkyl-, aryl- or aralkyl groups, or the groups B and D form a ring which may contain further hetero atoms) may be prepared by reacting amidoximes of the general Formula III with acrylic acid or beta-alkoxy-propionic acid or derivatives of these acids capable of acylation, thus preparing compounds of the general Formula VIII or compounds of the general Formula IX (where R and A have the same meaning as stated above and $R^4$ stands for a vinyl group or for the grouping of the Formula X, in which Formula $R^5$ stands for an alkyl group) and reacting the compounds thus obtained with amines of the general Formula XI (where B and D have the same meaning as stated above) if desired after ring-closure.

According to the first step of the process one may proceed by reacting the amidoximes with acid derivatives of acrylic acid capable for acylation. When acylation is carried out with acrylic acid chloride compounds of the general Formula VIII are formed, in which the group $R^4$ stands for a vinyl group. The reaction is effected in an organic solvent, preferably in acetone, chloroform or benzene. The reaction is carried out at a temperature below 50° C., preferably at 10–20° C. In order to bind the hydrochloric acid formed the reactions is carried out in the presence of acid-binding agents such as alkali hydrogen carbonates, alkali carbonates, tertiary amines or excess amidoxime. The O-acyl derivative formed may be isolated by pouring the reaction mixture into water, by means of filtration or on evaporation.

One may also proceed by reacting the amidoximes of the general Formula III with acrylic acid esters, thus preparing compounds of the general Formula IX in which $R^4$ stands for the grouping of the Formula X, where $R^5$ stands for an alkyl group. The reaction is carried out at 50–120° C. in alcohols as medium. The acrylic acid ester is used in an excess of 0.1–1.5 moles, calculated on the amidoxime. The reaction is carried out in the presence of 0.1–2 moles preferably 1 mole of alkali alcoholates or the appropriate amount of alkaline earth alcoholates, calculated on the amidoxime. It is preferred to effect the reaction by boiling the alcoholic solution of the components. The reaction mixture is worked up by evaporating the solvent, dissolving the residue in water and extracting the solution with an organic solvent. The compounds of the general Formula IX may be used for further reaction without any purification.

One may also proceed by reacting amidoximes of the general Formula III with beta-alkoxy-propionic acid or with acid derivatives of same capable for acylation. The reaction is carried out according to the conditions described by the reaction with acrylic acid chloride. Thus compounds of the general Formula VIII are obtained, where $R^4$ stands for the grouping of the Formula X in which $R^5$ stands for an alkyl group.

The compounds of the general Formula VIII may be transformed into compounds of the general Formula IX by ring closure. The reaction may be carried out by submitting compounds of the general Formula VIII to pyrolysis at a temperature above their melting point in vacuo in the form of a melt or by heating the compounds in the presence of acetic acid anhydride.

The second step of the process according to the present invention comprises reacting compounds of the general Formulae VIII or IX with amines of the general Formula XI. Piperidine, morpholine, pyrrolidine or dialkylamines may be used as amine and these compounds are applied in an excess of 5–100%. The reaction is carried out at a temperature below 170° C., preferably at 110–120° C. The reaction is effected in a nonpolar organic solvent, preferably in toluene as medium. When the amine used is volatile, the reaction is carried out in a closed system. The reaction mixture may be worked up by evaporating the solvent and the excess-amine in vacuo. The product is purified by salt-formation or vacuum distillation if desired. A preferred form of realisation of the process comprises carrying out the reaction in one step without isolating the intermediate product by reacting amidoximes of the general Formula III, simultaneously with acrylic acid ester and amines of the general Formula XI.

It has also been found according to the present invention that compounds of the general Formula XII (where $R^1$ has the same meaning as stated above) may be prepared by reacting compounds of the general Formula XIII (where $R^1$ has the same meaning as stated above) with benzene in the presence of Lewis-acids, such as aluminium bromide, stannic chloride, zinc chloride, titanium tetrachloride, preferably aluminium-chloride.

One may proceed preferably by carrying out the reaction in the presence of 3–6 moles of aluminum chloride. The reaction is effected in an organic solvent. One may use nitrobenzene, carbon disulfide, or preferably benzene as medium. The reaction is carried out at a temperature in the range of 40–120° C.

The reaction mixture may be worked up according to various methods depending on whether the substituent $R^1$ in position 5 contains a basic group or not. If the substituent $R^1$ contains no basic group one may proceed by decomposing the aluminium chloride complex with an acid and isolating the product directly from the organic phase. When the substituent $R^1$ contains a basic group it is preferable to dissolve the majority of aluminum hydroxide by making the acidic solution alkaline and then extracting the product with an organic solvent. The product may be purified by distillation or by means of crystallisation.

The compounds of the general Formula I may be converted into their salts formed with mineral acids such as hydrochloric acid, sulphuric acid, phosphoric acid or with organic acids, such as malic acid, lactic acid, tartaric acid, maleic acid, acetic aid, ascorbic aid, citric acid, etc. One salt may be converted into the other by addition of the appropriate acid and the bases may be set free from the salts.

According to a further feature of the present invention there are provided pharmaceutical compositions comprising one or more compounds of the general Formula I or acid addition salts thereof together with appropriate pharmaceutical carriers, e.g. any of the carriers known per se for the production of pharmaceutical compositions.

The said pharmaceutical compositions may be in form suitable for oral, or parenteral use. The compositions may contain sweetening, flavouring, colouring and preserving agents. Compositions intended for oral use may be prepared according to any method known to the art for the manufacture of pharmaceutical compositions, such as tablets, coated pills, suspensions, solutions, powders or granules, capsules, emulsions etc. The tablets may contain non-toxic pharmaceutical excipients commonly used in the manufacture of tablets, thus they may contain lubricating, binding, granulating disintegrating agents, diluents, etc.

Suspensions or solutions may contain the following excipients: suspending agents, dispersing or wetting agents, preservatives, thickening agents, etc. Powders and granules may contain wetting and suspending agents.

The pharmaceutical compositions may be in the form of a sterile injectible preparation, such as an aqueous solution or suspension, or in any other non-toxic parenterally acceptable diluent or solvent.

The following examples will serve to illustrate the invention.

*Example 1*

24.00 g. of beta-beta-diphenyl-propionyl-amidoxime and 37.00 g. of beta-piperidino-propionic acid ethyl ester are dissolved in 100 ml. of anhydrous ethanol, whereupon the warm solution is added to the solution of 2.30 g. sodium and 75 ml. of anhydrous ethanol. The residue of the amidoxime and ester are washed with 25 ml. of anhydrous ethanol to the alcoholate solution. The reaction mixture is boiled on a water bath for 8 hours. The alcohol is distilled off, whereupon 200 ml. of water and 4.0 g. of sodium hydroxide are added to the residue. On shaking the residue becomes oily and is then extracted with benzene. The benzene extract is evaporated, whereupon 35.63 g. of a distillation residue are obtained. On addition of 100 ml. of anhydrous ethanol containing hydrochloric acid 29.22 g. of 3-(beta,beta-diphenyl-ethyl)-5-(beta-piperidino-ethyl)-1,2,4-oxadiazole hydrochloride are obtained. M.P.: 192–193° C. The product may be recrystallized from anhydrous ethanol with minimum waste.

*Analysis.*—C=69.58%; H=7.75%; N=10.46% (calc.: C=69.42%; H=7.09%; N=10.56%).

The toxicity of the product amounts to $DL_{50}=37$ mg./kg. intravenously and $DL_{50}=1025$ mg./kg. perorally on mice.

In $ED_{50}=20$ mg./kg. subcutaneous dose the product decreases the coughing of guinea-pigs caused by the spray inhalation of 0.5 N sulfuric acid. In 40 mg./kg. oral dose the effect lasts for more than three hours. Tested according to the method of Domenjoz a 2–5 mg./kg. intravenous dose of the product inhibits the coughing caused by electric irritation of the nervus laryngeus superior on cats narcotized by 60 mg./kg. of Intranarcon; the effect lasts for 5–6 minutes. The product does not influence the respiration number and volume even in the dose of 100 mg./kg. on rabbits. On cats narcotized by Chloralose-urethane or Thialbarbitala 2–3 mg./kg. dose of the product when administered intravenously decreases blood-pressure for the period of about 1 minute and this effect can not be counteracted by atropine or antihistamine. On isolated guinea-pig intestines in the concentration of $7.6 \cdot 10^{-6}$ the product inhibits the spasm caused by carbaminochlorine, barium chloride, histamine and nicotine, when tested according to the method of Magnus. On cats narcotized by Chloralose-urethane, an intravenously administered 1 mg./kg. dose of the product stops the intestine-peristalsis; the duration of the effect was found to be 2–3 minutes, but greater doses act for longer periods.

*Example 2*

2.4 g. of beta,beta-diphenyl-propionyl-amidoxime are dissolved in 20 ml. of anhydrous pyridine, whereupon 1.97 g. of beta-piperidino-propionyl-chloride hydrochloride are added while the reaction mixture is cooled with ice so that the temperature does not exceed 20° C. The solution is refluxed on a water bath for 2 hours, whereupon it is evaporated in vacuo and 10 ml. of a 2 N sodium hydroxide solution are added. The solution is extracted with ether, dried and evaporated. The residual oil is dissolved in 3 ml. of anhydrous ethanol whereupon the solution is acidified with anhydrous alcohol containing hydrochloride acid. The reaction mixture is allowed to stand in a refrigerator whereupon 3-(beta,beta-diphenyl-ethyl)-5-(beta-piperidino-ethyl)-1,2,4-oxadiazole hydrochloride is obtained in the form of crystals. M.P. 192–193° C.

*Example 3*

27.6 g. of beta,beta-diphenyl-propionyl-amidoxime and 9.86 g. of sodium hydrogen carbonate are suspended in 140 ml. of anhydrous acetone whereupon the acetone solution of 14.53 g. of beta-chloro-propionyl chloride is added dropwise at 0–5° C. while stirring constantly. The reaction mixture is stirred for 7 hours and poured in 1100 ml. of water. The precipitated crystals are filtered and dried. 27.8 g. of O-(beta-chloro-propionyl)-beta,beta-diphenyl-propionyl amidoxime are obtained. The product may be recrystallized from benzene or anhydrous ethanol. M.P. 116–117° C.

*Example 4*

4.55 g. of O-(beta-chloro-propionyl)-beta,beta-diphenyl-propionyl amidoxime are dissolved in 25 ml. of anhydrous toluene while heating, whereupon 3 ml. of piperidine are added dropwise. The reaction mixture is refluxed for 7 hours. The precipitated piperidine hydrochloride is dissolved in 20 ml. of water, the toluene layer is evaporated. Anhydrous ethanol containing hydrochloride acid is added to the distillation residue, whereupon 2.15 g. of 3-(beta,beta-diphenyl-ethyl)-5-(beta-piperidino-ethyl)-1,2,4-oxadiazole hydrochloride are obtained. The product may be recrystallized from anhydrous alcohol. M.P. 192° C.

*Example 5*

24.0 g. of beta,beta-diphenyl-propionyl-amidoxime are dissolved in 180 ml. of anhydrous acetone and 10.6 g. of anhydrous sodium carbonate are added. The solution of 9.1 g. of distilled acrylic acid chloride and 10 ml. of acetone are added dropwise to the cooled solution of the amidoxime while stirring constantly. The reaction mixture is allowed to stand for 12 hours, whereupon it is poured into 500 ml. of water. Thus 27.70 g. of O-acroyl-beta,beta-diphenyl-propionyl-amidoxime are obtained. M.P. 127° C. The product may be recrystallized from a mixture of benzene and petrol.

*Analysis.*—N=9.17% (calc.: 9.52).

*Example 6*

5.89 g. of O-acroyl-beta,beta-diphenyl-propionyl-amidoxime are admixed with 4 ml. of piperidine. The warm reaction mixture is heated in an oil bath at 120–140° C. for 5 hours, whereupon the piperidine is distilled off in vacuo. Anhydrous alcohol containing hydrochloric acid is added to the residue to precipitate 3-(beta,beta-diphenyl-ethyl)-5-(beta-piperidino-ethyl)-1,2,4-oxadiazole hydrochloride which is recrystallized from anhydrous ethanol. M.P. 192–193° C.

*Example 7*

12.0 g. of beta,beta-diphenyl-propionyl-amidoxime and 10 g. of ethyl acrylate are dissolved in 75 ml. of anhydrous ethanol and the solution is added to a solution of 1.15 g. of sodium and 25 ml. of anhydrous ethanol. The reaction mixture is boiled on a water bath for 8 hours, whereupon it is evaporated in vacuo. The residue is dissolved in 200 ml. of water containing 4 g. of NaOH, whereupon the aqueous solution is extracted with benzene and the solvent is evaporated. Thus 12.60 g. of 3-beta-beta-diphenyl-ethyl) - 5 - (beta-ethoxy-ethyl)-1,2,4-oxadiazole are obtained. The product may be purified by vacuum distillation. The main fraction distills as 173° C./0.65 Hg mm. The product becomes solid in a refrigerator.

*Analysis.*—C=74.20%, H=6.95%, N=8.66% (calc.: C=74.50%, H=6.88%, N=8.69%).

*Example 8*

12 g. of beta,beta-diphenyl-propionyl-amidoxime, 10 g. of ethyl acrylate and the solution of 5.5 ml. of piperidine and 75 ml. of anhydrous ethanol are added to the solution of 1.15 g. of sodium and 25 ml. of anhydrous ethanol, whereupon the reaction mixture is boiled for 8 hours. The solvent is distilled off, 100 ml. of water containing 2 g. of sodium hydroxide are added to the residue and the aqueous solution is extracted with benzene. The solvent is evaporated, whereupon alcohol containing hydrochloric acid is added to the residue. Thus 3-(beta,beta-diphenyl-ethyl) - 5-(beta-piperidino-ethyl)-1,2,4-oxadiazole hydrochloride is obtained.

*Example 9*

24.00 g. of beta,beta-diphenyl-propionylamidoxime are reacted with 34.20 g. of beta-pyrrolidino-propionic acid ethyl ester according to the process described in the previous example. The distillation residue of the benzene solution weighs 32.77 g. from which 29.97 g. of the hydrogen maleate are obtained on reacting with 14.1 g. of maleic acid in the mixture of 50 ml. of anhydrous ethanol and 150 ml. of ether, M.P. 124–127° C. On recrystallization from ethyl acetate or water pure 3-(beta, beta - diphenyl - ethyl) - 5-(beta-pyrrolidino-ethyl)-1,2,4-oxadiazole hydrogenmaleate is obtained, M.P. 129–131° C.

*Analysis.* — C=67.28%, H=6.29%. (Calc.: C=67.37%, H=6.31%.)

On isolated guinea-pig intestines the product counteracts the effect of carbamylcholine in the concentration of $1 \times 10^{-5} - 5 \times 10^{-5}$. On narcotized cats 1–2 mg./kg. intravenous dose of the product decreases blool-pressure by 20–30 Hg mm. for some minutes.

| | | Compounds, gr. | | | | | M.P., °C. |
|---|---|---|---|---|---|---|---|
| | | III | | IV | | I | |
| 10 | 24.00 | Beta, beta-diphenyl-propionyl-amidoxime. | 34.20 | Piperidino-acetic acid ethyl ester | 32.22 | 3-[beta,beta-diphenyl-ethyl]-5-piperidino-methyl-1,2,4-oxadiazole HCl. | 188–189 |
| 11 | 12.00 | ---do--- | 17.20 | Beta-diethyl-amino-propionic acid ethyl ester. | 8.47 | 3-[beta,beta-diphenyl-ethyl]-5-[beta-diethyl-aminoethyl]-1,2,4-oxadiazole HCl. | 181 |
| 12 | 10.35 | O-gamma-chlorobutyryl-beta, beta-diphenyl-propionylamidoxime. | 6 ml | Acetanhydride | 9.90 | 3-[beta,beta-diphenylethyl]-5-[gamma-chloropropyl]-1,2,4-oxadiazole. | |
| 13 | 12.00 | Beta, beta-diphenyl-propionyl-amidoxime. | 16.52 | p-Amino-benzoic acid ethyl ester | 16.27 | 3-[beta,beta-diphenyl-ethyl]-5-[4-aminophenyl]-1,2,4-oxadiazole. | 149 |
| 14 | 12.00 | ---do--- | 15.10 | Isonicotinic acid ethyl ester | | 3-[beta,beta-diphenylethyl]-5-[4-pyridyl]-1,2,4-oxadiazole. | 158–159 |
| 15 | 12.00 | ---do--- | 15.10 | Nicotinic acid ethyl ester | | 3-[beta,beta-diphenyl-ethyl]-5-[3-pyridyl]-1,2,4-oxadiazole. | 137 |
| 16 | 12.00 | ---do--- | 15.10 | Picolinic acid ethyl ester | | 3-[beta,beta-diphenyl-ethyl]-5-[2-pyridyl]-1,2,4-oxadiazole. | 151–152 |
| 17 | 4.80 | Alpha,beta-diphenyl-propionyl-amidoxime. | 6.84 | Piperidino-acetic acid ethyl ester | 6.35 | 3-[alpha,beta-diphenyl-ethyl]-5-piperidino-methyl-1,2,4-oxadiazole HCl. | 185 |
| 18 | 22.60 | Diphenyl-acetamidoxime | 34.20 | ---do--- | 27.50 | 3-diphenyl-methyl-5-piperidino-methyl-1,2,4-oxadiazole HCl. | 161 |
| 19 | 22.60 | ---do--- | 18.50 | Beta-piperidino-propionic acid ethyl ester. | 9.30 | 3-[diphenyl-methyl]-5-[beta-piperidino-ethyl]-1,2,4-oxadiazole HCl. | 197 |
| 20 | 21.02 | [3,4-dimethoxyphenyl]-acetamidoxime. | 37.40 | Beta-morpholino-propionic acid ethyl ester. | 27.49 | 3-[3,4-dimethoxybenzyl]-5-[beta-morpholino-ethyl]-1,2,4-oxadiazole HCl. | 181 |
| 21 | 21.02 | ---do--- | 34.25 | Beta-pyrrolidino-propionic acid ethyl ester. | 24.70 | 3-[3,4-dimethoxybenzyl]-[beta-pyrrolidino-ethyl]-1,2,4-oxadiazole HCl. | 162 |
| 22 | 15.50 | ---do--- | 27.30 | Beta-piperidino-propionic acid ethyl ester. | 18.25 | 3-[3,4-dimethoxybenzyl]-5-beta-piperidino-ethyl-1,2,4-oxadiazole HCl. | 177 |
| 23 | 21.03 | 3,4-dimethoxy-phenyl-acetamidoxime. | 34.25 | Piperidino-acetic acid ethyl ester | 26.58 | 3-[3,4-dimethoxybenzyl]-5-piperidinomethyl-1,2,4-oxadiazole HCl. | 189 |
| 24 | 9.33 | [p-Chlorophenyl]-acetamidoxime | 18.50 | Beta-piperidino-propionic acid ethyl ester. | 12.80 | 3-[-p-chlorobenzyl]-5-[beta-piperidino-ethyl]-1,2,4-oxadiazole HCl. | 183 |
| 25 | 9.33 | ---do--- | 18.70 | Beta-morpholino-propionic acid ethyl ester. | 12.80 | 3-[p-chloro-benzal]-5-[beta-morpholino-ethyl]-1,2,4-oxadiazole HCl. | 179–180 |
| 26 | 9.33 | ---do--- | 17.30 | Piperidino-acetic acid ethyl ester | | 3-[p-chloro-benzyl]-5-piperidino-methyl-1,2,4-oxadiazole HCl. | 157 |
| 27 | 9.33 | ---do--- | 17.30 | Beta-pyrrolidino-propionic acid ethyl ester. | | 3-[p-chloro-benzyl]-5-[beta-pyrrolidino-ethyl]-1,2,4-oxadiazole HCl. | 155 |
| 28 | 6.18 | Beta,beta-bis[4-chloro-phenyl]-propionylamidoxime. | 6.84 | Piperidino-acetic acid ethyl ester | | 3-[beta,beta-bis-(4-chloro-phenyl)-ethyl]-5-piperidino-methyl-1,2,4-oxadiazole-hydrogenmaleate. | 117 |
| 29 | 6.18 | ---do--- | 7.40 | Beta-piperidino-propionic acid ethyl ester. | | 3-[beta,beta-bis-(4-chloro-phenyl)-ethyl]-5-[beta-piperidino-ethyl]-1,2,4-oxadiazole-hydrogenmaleate. | 126 |
| 30 | 17.32 | Di-[3,4-dimethoxy-phenyl]-acet-amidoxime. | 18.50 | ---do--- | 16.72 | 3-[bis-(3,4-dimethoxy-phenyl)-methyl]-5-[beta-piperidino-ethyl]-1,2,4-oxadiazole. | 96 |
| 31 | 6.93 | ---do--- | 7.48 | Beta-morpholino-propionic acid ethyl ester. | | 3-[bis-(3,4-dimethoxy-phenyl)-methyl]-5-[beta-morpholino-ethyl]-1,2,4-oxadiazole. | 112–113 |
| 32 | 7.20 | Alpha,beta-diphenyl-propionyl-amidoxime. | 11.10 | Beta-piperidino-propionic acid ethyl ester. | 9.48 | 3-[alpha,beta-diphenyl-ethyl]-5-[beta-piperidino-ethyl]-1,2,4-oxadiazole HCl. | 186–187 |
| 33 | 6.01 | ---do--- | 10.01 | N-methyl-piperazino-propionic acid ethyl ester. | 9.30 | 3-[alpha,beta-diphenyl-ethyl]-5-[beta-(N-methyl-piperazino)-ethyl]-1,2,4-oxadiazole-dichlorohydrate. | 189 |

| | Compounds, gr. | | | | | M.P., °C. |
|---|---|---|---|---|---|---|
| | III | | IV | | I | |
| 34 | 6.01 | Beta,beta-diphenyl-propionyl-amidoxime. | 10.01 | ----do---- | 9.80 | 3-[beta,beta-diphenyl-ethyl]-5-[beta-(N-methyl-piperazino)-ethyl]-1,2,4-oxadiazole-dichlorohydrate. | 203-204 |
| 35 | 6.79 | Diphenyl-acetamidoxime. | 12.01 | ----do---- | 8.28 | 3-diphenyl-methyl-5-[beta-N-methyl-piperazino-ethyl]-1,2,4-oxadiazole dichlorohydrate. | 196-197 |
| 36 | 7.39 | p-Chloro-phenyl-acetamidoxime. | 16.02 | ----do---- | 13.67 | 3-[p-chloro-benzyl]-5-[beta-(N-methyl-piperazino)-ethyl]-1,2,4-oxadiazole-dichlorohydrate. | 188 |
| 37 | 8.66 | Tetramethoxy-diphenyl-acetamidoxime. | 10.01 | ----do---- | 8.43 | 3-[bis-(3,4-dimethoxy-phenyl)-methyl]-5-[2-(N-methyl-piperazino)-ethyl]-1,2,4-oxadiazole dichlorohydrate. | 201-202 |
| 38 | 8.41 | Dimethoxy-phenyl-acetamidoxime. | 16.02 | ----do---- | 11.71 | 3-[3,4-dimethoxy-benzyl]-5-[beta-(N-methyl-piperazino)-ethyl]-1,2,4-oxadiazole dichlorohydrate. | 185-187 |

Example 39

84 g. of beta,beta-diphenyl-propionyl-amidoxime are dissolved in 1310 ml. of warm benzene, whereupon the solution of 24.53 g. of gamma-chloro-butyric acid chloride and 170 ml. of benzene are added. The hot reaction mixture is allowed to stand for 24 hours, whereupon the precipitated product (97.20 g.) containing also beta,beta-diphenyl-propionyl-amidoxime hydrochloride is filtered. The product is suspended in 1000 ml. of water, the suspension is allowed to stand for a day and filtered, whereupon 44.59 g. of O-(gamma-chlorobutyryl)-beta,beta-diphenyl-propionyl-amidoxime are obtained. M.P.: 139–140° C. On recrystallization the melting point amounts to 145° C. 40.60 g. of beta,beta-diphenyl-propionyl-amidoxime may be recovered from the aqueous filtrate by adding a sodium-carbonate solution.

Example 40

9.90 g. of 3-(beta,beta-diphenyl-ethyl)-5-(gamma-chloropropyl)-1,2,4-oxadiazole are dissolved in 45 ml. of toluene, whereupon 8.90 ml. of pyridine are added. The reaction mixture is refluxed for 11 hours, and the precipitated piperidine-hydrochloride is filtered. On evaporating the toluene filtrate 11.20 g. of crude 3-(beta,beta-diphenyl-ethyl)-5-(gamma-piperidino-propyl)-1,2,4-oxadiazole are obtained. 7.84 g. of the hydrogen maleate of the product are obtained on addition of maleic acid in the mixture of alcohol and ethyl acetate as medium. M.P. 146–147° C.

Analysis.—C=68.62%, H=6.81% (calc.: C=68.41%, H=6.77%).

Example 41

10.35 g. of O-(gamma-chloro-butyryl)-beta,beta-diphenyl-propionyl-amidoxime are boiled with 8.90 ml. of piperidine in 150 ml. of toluene for 48 hours. The reaction mixture is filtered, the toluene filtrate is washed with water and evaporated. Thus 3-(beta,beta-diphenyl-ethyl)-5-(gamma-piperidino-propyl)-1,2,4-oxadiazole is obtained. The hydrogen maleate of the product may be prepared in the mixture of ether and alcohol by adding maleic acid.

Example 42

9.90 g. of 3-(beta,beta-diphenyl-ethyl)-5-(gamma-chloropropyl)-1,2,4-oxadiazole are heated with 7.9 ml. of morpholine in 45 ml. of toluene for 11 hours. The reaction mixture is filtered, the toluene filtrate is extracted with water and evaporated. Thus 9.95 g. of 3-(beta,beta-diphenyl-ethyl)-5-(gamma-morpholino-propyl)-1,2,4-oxadiazole are obtained. The hydrogen maleate of the product may be prepared in the mixture of ether and alcohol on addition of maleic acid. M.P. 153° C.

Analysis.—N=8.84% (calc.: N=8.51%).

Example 43

5.59 g. of 3-stiryl-5-methyl-1,2,4-oxadiazole are dissolved in 60 ml. of anhydrous benzene and 15.96 g. of anhydrous aluminum chloride are added. The reaction mixture is refluxed for 2 hours while stirring constantly, whereupon it is poured into the mixture of 92.3 ml. of concentrated hydrochloric acid and 440 ml. of water. The layers are separated. Benzene is evaporated and the distillation residue (6.85 g.) is subjected to vacuum distillation. The main fraction runs at 159–160° C./0.1 Hg mm. Thus 3-(beta,beta-diphenyl-ethyl)-5-methyl-1,2,4-oxadiazole is obtained. M.P. 79° C.

Analysis.—N=10.39% (calc.: 10.60).

Example 44

24.0 g. of beta,beta-diphenyl-propionyl amidoxime are dissolved in 150 ml. of anhydrous acetone and 8.6 g. of sodium hydrogen carbonate are added. The solution of 11.3 g. chloro-acetyl chloride in acetone is added while stirring constantly and cooling. The reaction mixture is allowed to stand for 12 hours, and poured then into 1000 ml. of water. 28.47 g. of O-chloroacetyl-beta,beta-diphenyl-propionyl-amidoxime are obtained in the form of an oil, which crystallizes quickly. The product is dried in a desiccator. On recrystallisation from benzene the melting point of the product amounts to 118–119° C.

Analysis.—N=8.70%, Cl=10.98% (calc.: N=8.84%, Cl=11.19%).

Example 45

O-chloro-acetyl-beta,beta-diphenyl-propionyl amidoxime prepared according to Example 44 is heated in an oil bath at 100–110° C. in vacuo for 10–15 minutes. Thus 3-(beta,beta-diphenyl-ethyl)-5-chloro-methyl-1,2,4-oxadiazole is obtained. The product may be recrystallized from methanol. M.P. 73–74° C.

Analysis.—N=9.36%, Cl=11.60% (calc.: N=9.38%, Cl=11.87%).

Example 46

8.97 g. of 3-(beta,beta-diphenyl-ethyl)-5-chloro-methyl-1,2,4-oxadiazole are heated with the solution of 6 ml. of piperidine and 20 ml. of toluene for 7 hours. The precipitated piperidine hydrochloride is dissolved by adding 20 ml. of water, whereupon the toluene is distilled off and 20 ml. of anhydrous ethanol containing hydrochloric acid are added to the distillation residue. On filtration 9.25 g. of 3-(beta,beta-diphenyl-ethyl)-5-piperidino-methyl-1,2,4-oxadiazole hydrochloride are obtained. M.P. 187–189° C. The product may be recrystallized from methanol.

Example 47

18.49 g. of p-chloro-phenyl-acetamidoxime are dissolved in 100 ml. of anhydrous acetone, 10.6 g. of anhydrous sodium carbonate are added and acylation is carried out with 9.1 g. of acrylic acid chloride according to the method described in Example 5. Thus 20.90 g. of O-acroyl-(p-chloro-phenyl)-acetamidoxime are obtained. M.P. 130° C. The product may be recrystallized from benzene.

Analysis.—N=11.68% (calc.: 11.71).

Example 48

18.46 g. of p-chloro-phenyl-acetamidoxime and 20 g. of ethyl acrylate are dissolved in 150 ml. of anhydrous ethanol and the solution is added to a solution of 2.3 g. of sodium and 50 ml. of anhydrous ethanol. The reaction mixture is boiled on a water bath for 8 hours and concentrated in vacuo. The residue is dissolved in 200 ml. of water containing 4 g. of sodium hydroxide, whereupon the aqueous solution is extracted with benzene, the solvent is evaporated and thus 20.32 g. of crude 3-(4-chlorobenzyl)-5-(beta-ethoxy-ethyl)-1,2,4-oxadiazole are obtained. Heated with 16 ml. of piperidine in an oil bath at 120–130° C. for 5 hours the excess of piperidine is distilled off and alcohol containing hydrochloric acid is added to the residue. Thus 6.13 g. of 3-(4-chloro-benzyl)-5-beta-piperidine-ethyl)-1,2,4-oxadiazole hydrochloride are obtained. M.P. 183° C.

Example 49

The following composition is suitable for peroral administration for human therapy.

|  | G. |
|---|---|
| 3-(beta,beta-diphenyl-ethyl)-5-(beta-piperidino-ethyl-1,2,4-oxadiazole hydrochloride | 0.1000 |
| Lactose | 0.0590 |
| Gelatine | 0.0030 |
| Amylum solani | 0.0300 |
| Talcum | 0.0060 |
| Magnesium stearate | 0.0020 |
|  | 0.2000 |

What we claim is:

1. A new and novel material selected from the group consisting of compounds having the formula:

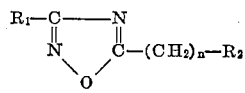

wherein $R_1$ is selected from the group consisting of diphenyl alkyl radicals wherein said alkyl radical contains from 1 to 2 carbon atoms, methoxy substituted diphenyl alkyl radicals wherein said alkyl radical contains from 1 to 2 carbon atoms, chloro substituted diphenyl alkyl radicals wherein said alkyl radical contains from 1 to 2 carbon atoms and a 2 diphenyl ethyl radical, $n$ is an integer from 0 to 4 and $R_2$ radical is a radical selected from the group consisting of piperidyl, pyrrolidyl, diethyl amino, morpholyl, amino phenyl, pyridyl, piperazyl and alkyl radicals containing from 1 to 3 carbon atoms and salts thereof.

2. The material of claim 1 wherein $R_1$ is a diphenyl alkyl radical wherein said alkyl radical contains from 1 to 2 carbon atoms.

3. The material of claim 1 wherein $R_1$ is a chloro diphenylalkyl radical, wherein said alkyl radical contains from 1 to 2 carbon atoms.

4. The material of claim 1 wherein $R_1$ is a methoxy diphenyl alkyl radical wherein said alkyl radical contains from 1 to 3 carbon atoms.

5. 3 - (beta,beta-diphenyl - ethyl) - 5 - (beta - piperidino-ethyl)-1,2,4-oxadiazole.
6. 3 - (beta,beta - diphenyl - ethyl) - 5 - (beta - pyrrolidino-ethyl)-1,2,4-oxadiazole.
7. 3 - (beta,beta - diphenyl - ethyl) - 5 - piperidino-methyl-1,2,4-oxadiazole.
8. 3 - (beta,beta - diphenyl - ethyl) - 5 - (beta - diethyl-amino-ethyl)-1,2,4-oxadiazole.
9. 3 - (beta,beta - diphenyl - ethyl) - 5 - (gamma - chloro-propyl)-1,2,4-oxadiazole.
10. 3 - (beta,beta - diphenyl - ethyl) - 5 - (gamma-piperidino-propyl)-1,2,4-oxadiazole.
11. 3 - (beta,beta - diphenyl - ethyl) - 5 - (gamma-morpholino-propyl)-1,2,4-oxadiazole.
12. 3 - (beta,beta - diphenyl - ethyl) - 5 - (4 - amino-phenyl)-1,2,4-oxadiazole.
13. 3 - (beta,beta - diphenyl - ethyl) - 5 - (4 - pyridyl)-1,2,4-oxadiazole.
14. 3 - (beta,beta - diphenyl - ethyl) - 5 - (3 - pyridyl)-1,2,4-oxadiazole.
15. 3 - (beta,beta - diphenyl - ethyl) - 5 - (2 - pyridyl)-1,2,4-oxadiazole.
16. 3 - (alpha,beta - diphenyl - ethyl) - 5 - piperidino-methyl-1,2,5-oxadiazole.
17. 3 - diphenyl - methyl - 5 - piperidino - methyl-1,2,4-oxadiazole.
18. 3 - diphenyl - methyl - 5 - (beta - piperidino-ethyl)-1,2,4-oxadiazole.
19. 3 - [beta,beta - bis - (4 - chloro - phenyl) - ethyl]-5-piperidino-methyl-1,2,4-oxadiazole.
20. 3 - [beta,beta - bis - (4 - chloro - phenyl) - ethyl]-5-(beta-piperidino-ethyl)-1,2,4-oxadiazole.
21. 3 - [bis - (3,4 - dimethoxy - phenyl) - methyl] - 5-(beta-piperidino-ethyl)-1,2,4-oxadiazole.
22. 3 - [bis - (3,4 - dimethoxy - phenyl) - methyl] - 5-(beta-morpholino-ethyl)-1,2,4-oxadiazole.
23. 3 - (alpha,beta - diphenyl - ethyl) - 5 - (beta-piperidino-ethyl)-1,2,4-oxadiazole.
24. 3 - (alpha,beta-diphenyl - ethyl) - 5 - [beta - (N-methyl-piperazino)-ethyl]-1,2,4-oxadiazole.
25. 3 - (beta,beta - diphenyl - ethyl) - 5 - [beta - (N-methyl-piperazino)-ethyl]-1,2,4-oxadiazole.
26. 3 - diphenyl - methyl - 5 - [beta - (N - methyl-piperazino)-ethyl]-1,2,4-oxadiazole.
27. 3 - [bis - (3,4 - dimethoxy - phenyl) - methyl] - 5-[beta-(N-methyl-piperazino)-ethyl]-1,2,4-oxadiazole.

References Cited by the Examiner
UNITED STATES PATENTS 3,141,019  7/1964  Palazzo et al. _____ 260—247.5

OTHER REFERENCES

Palazzo et al.: J. Med. Pharm. Chem., vol. 4 (1961), pp. 351–367, RS 1 J5.

ALEX MAZEL, *Primary Examiner.*

R. J. GALLAGHER, *Assistant Examiner.*